(12) United States Patent
Harrold et al.

(10) Patent No.: US 12,618,465 B1
(45) Date of Patent: May 5, 2026

(54) ANTI-BACKLASH SYSTEM AND METHOD OF MANUFACTURE

(71) Applicant: Honeybee Robotics, LLC, Longmont, CO (US)

(72) Inventors: David M. Harrold, Longmont, CO (US); Charles R. Steinke, Longmont, CO (US); Erik Michael Plugge, Longmont, CO (US); Matthew Vera, Boulder, CO (US); Stella S. Dearing, Longmont, CO (US); Javier Venancio Becerra, Boulder, CO (US); Lee Carlson, Broomfield, CO (US); Kyle Gotthelf, Kent, WA (US)

(73) Assignee: Honeybee Robotics, LLC, Longmont, CO (US)

( * ) Notice: Subject to any disclaimer, the term of this patent is extended or adjusted under 35 U.S.C. 154(b) by 0 days.

(21) Appl. No.: 19/059,679

(22) Filed: Feb. 21, 2025

(51) Int. Cl.
*F16H 57/12* (2006.01)

(52) U.S. Cl.
CPC ....... *F16H 57/12* (2013.01); *F16H 2057/123* (2013.01)

(58) Field of Classification Search
CPC ..... F16H 57/12; F16H 2057/123; F16H 55/18
See application file for complete search history.

(56) References Cited

U.S. PATENT DOCUMENTS

| | | | |
|---|---|---|---|
| 5,540,630 A | 7/1996 | Vranish | |
| 5,542,311 A * | 8/1996 | Deeg | F16H 1/22 74/410 |
| 8,567,278 B2 * | 10/2013 | Mangelsen | F16H 57/12 74/440 |
| 9,732,990 B2 | 8/2017 | Pilegaard | |
| 2007/0295136 A1 * | 12/2007 | Fleming | F16H 57/12 74/440 |

FOREIGN PATENT DOCUMENTS

| | | | | |
|---|---|---|---|---|
| JP | 2020148323 A * | 9/2020 | | F16H 57/023 |
| WO | WO-2013028463 A1 * | 2/2013 | | F16H 57/12 |

* cited by examiner

*Primary Examiner* — Bobby Rushing, Jr.
(74) *Attorney, Agent, or Firm* — McCarter & English, LLP; Dave S. Christensen

(57) ABSTRACT

A system having an anti-backlash mechanism, a method for removing backlash, and an anti-backlash mechanism for a gear assembly is provided. The gear assembly having a pinion and an output gear. The anti-backlash mechanism includes a frame and a first idler gear operably disposed between the pinion and the output gear. A first flexure device is coupled between the first idler gear and the frame, the first flexure device applying a pre-load to the first idler gear to move the first idler gear into engagement with the pinion and output gear. A second idler gear is operably disposed between the pinion and the output gear. A second flexure device is coupled between the second idler gear and the frame, the second flexure device applying a pre-load to the second idler gear to move the second idler gear into engagement with the pinion and output gear.

20 Claims, 5 Drawing Sheets

100

ANTI-BACKLASH SYSTEM AND METHOD OF MANUFACTURE

BACKGROUND OF THE DISCLOSURE

The subject matter disclosed herein relates to a system that includes a gear train, and in particular to a system having a mechanism to reduce or eliminate backlash.

The mating of gears typically results in a small clearance between the gear teeth. This clearance, commonly referred to as backlash, is what allows the gears to smoothly mesh and transmission of torque. Due to backlash, in systems where the gears may operate in two directions, there is a brief loss of motion while the engaged gear teeth take up the backlash gap.

In some embodiments, so-called anti-backlash mechanisms are used to reduce or eliminate the brief loss of motion. Various anti-backlash mechanisms have been proposed, including spring loaded split gears and the use of external spring windup mechanisms. These mechanisms typically consist of a pair of gears mounted on a common hub. One of the gears is fixed to the hub. The second gear "floats" or is allowed to move laterally relative to the hub and is attached to the fixed gear by springs.

While existing systems having gear trains are suitable for their intended purposes the need for improvement remains, particularly in providing a system having an anti-backlash mechanism having the features described herein.

BRIEF DESCRIPTION OF THE DISCLOSURE

According to one aspect of the disclosure an anti-backlash mechanism for a gear assembly having a pinion and an output gear is provided. The anti-backlash mechanism includes a frame and a first idler gear operably disposed between the pinion and the output gear. A first flexure device is coupled between the first idler gear and the frame, the first flexure device applying a pre-load to the first idler gear to move the first idler gear into engagement with the pinion and output gear. A second idler gear is operably disposed between the pinion and the output gear. A second flexure device is coupled between the second idler gear and the frame, the second flexure device applying a pre-load to the second idler gear to move the second idler gear into engagement with the pinion and output gear.

In addition to one or more of the features described herein, or as an alternative, further embodiments of the anti-backlash mechanism may include the first flexure device having a first portion coupled to the frame, a second portion coupled to the first idler gear, and a biasing portion disposed between the first portion and the second portion.

In addition to one or more of the features described herein, or as an alternative, further embodiments of the anti-backlash mechanism may include the biasing portion being defined by a first slot and a second slot, the first slot being disposed between first portion and a flexure arm, the second slot being disposed between the second portion and the flexure arm.

In addition to one or more of the features described herein, or as an alternative, further embodiments of the anti-backlash mechanism may include the flexure arm being coupled to the first portion on a first end and is coupled to the second portion on an opposing second end.

In addition to one or more of the features described herein, or as an alternative, further embodiments of the anti-backlash mechanism may include the first portion, the second portion, and the biasing portion are made from the same material.

In addition to one or more of the features described herein, or as an alternative, further embodiments of the anti-backlash mechanism may include the first portion, the second portion, and the biasing portion are made from a single unitary member.

In addition to one or more of the features described herein, or as an alternative, further embodiments of the anti-backlash mechanism may include the material is titanium.

In accordance with another aspect of the disclosure, a method of assembling an anti-backlash assembly between a driving device and a load is provided. The method includes coupling a first idler gear to a first flexure device, the first flexure device being disposed between the first idler gear and a frame. A second idler gear is coupled to a second flexure device, the second flexure device being disposed between the second idler gear and the frame. The first idler gear is pre-loaded against a pinion with the first flexure device, the pinion being coupled to the driving device. The second idler gear is pre-loaded against the pinion with the second flexure device.

In addition to one or more of the features described herein, or as an alternative, further embodiments of the method may include the step of pre-loading the first idler gear includes inserting at least one first shim in a first slot in the first flexure device and wet pinning the first flexure device to the frame.

In addition to one or more of the features described herein, or as an alternative, further embodiments of the method may include the step of pre-loading the second idler gear include inserting at least one second shim in a second slot in the first flexure device and wet pinning the second flexure device to the frame.

In addition to one or more of the features described herein, or as an alternative, further embodiments of the method may include the first shim and second shim being removed after the wet pinning of the first flexure device and second flexure device has cured.

In addition to one or more of the features described herein, or as an alternative, further embodiments of the method may include the preloading the first idler gear and the preloading of the second idler gear includes removing backlash between the first idler gear and the pinion and the second idler gear and the pinion.

According to another aspect of the disclosure, a system is provided. The system includes a rotational driving device having a pinion. A load having a load gear is configured to rotate in response to rotation of the pinion. An anti-backlash mechanism is operably coupled between the rotational driving device and the load. The anti-backlash mechanism includes a frame and a first idler gear operably disposed between the pinion and the load gear. A first flexure device is coupled between the first idler gear and the frame, the first flexure device applying a pre-load to the first idler gear to move the first idler gear into engagement with the pinion and load gear. A second idler gear is operably disposed between the pinion and the load gear. A second flexure device is coupled between the second idler gear and the frame, the second flexure device applying a pre-load to the second idler gear to move the second idler gear into engagement with the pinion and load gear.

In addition to one or more of the features described herein, or as an alternative, further embodiments of the system may include the first flexure device having a first portion coupled to the frame, a second portion coupled to the first idler gear, and a biasing portion disposed between the first portion and the second portion.

In addition to one or more of the features described herein, or as an alternative, further embodiments of the method may include the biasing portion being defined by a first slot and a second slot, the first slot being disposed between first portion and a flexure arm, the second slot being disposed between the second portion and the flexure arm.

In addition to one or more of the features described herein, or as an alternative, further embodiments of the method may include the flexure arm being coupled to the first portion on a first end and is coupled to the second portion on an opposing second end.

In addition to one or more of the features described herein, or as an alternative, further embodiments of the method may include the first portion, the second portion, and the biasing portion being made from the same material.

In addition to one or more of the features described herein, or as an alternative, further embodiments of the method may include the first portion, the second portion, and the biasing portion being made from a single unitary member.

In addition to one or more of the features described herein, or as an alternative, further embodiments of the method may include the material is titanium.

In addition to one or more of the features described herein, or as an alternative, further embodiments of the method may include the rotational driving device being an electric motor and the load includes a mirror.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide for a system having an gear arrangement that lowers the center distance between idler gears and a pinion gear. Further embodiments of the present disclosure provide for a system having idler gears mounted on flexures that provide for zero or near zero backlash without locking the gears. Still further embodiments of the present disclosure provide for an anti-backlash mechanism that has linear thermal expansion characteristic. Still further embodiments of the present disclosure provide for an anti-backlash mechanism that is compact and light weight.

Figure 1:
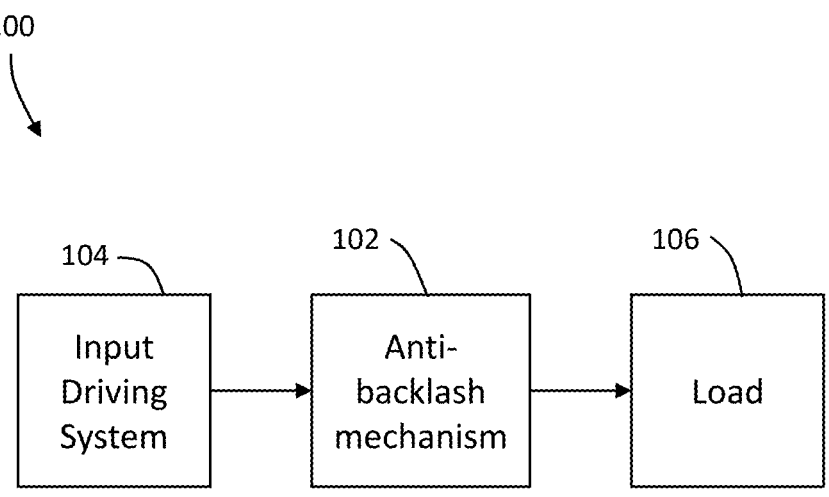
FIG. 1 is a schematic illustration of a system having an anti-backlash mechanism in accordance with an embodiment.

Referring now to FIG. 1, an embodiment is shown of a system 100 having an anti-backlash mechanism 102 disposed between an input driving system 104 and a load 106. In an embodiment, the input driving system 104 may be an electric motor having a pinion that engages the anti-backlash mechanism 102. It should be appreciated that other input driving systems may be used, such as an internal combustion engine, a turbine engine, a flywheel, or a combination of the foregoing for example. In an embodiment, the load 106 includes an input or load gear that is responsive to rotate in response to rotation of the pinion. In some embodiments, the load 106 may be a system where a high level of positional accuracy is desired, such as on a satellite or other spacecraft. In some embodiments, the load being positioned or rotated may be a device such as but not limited to a mirror, a telescope, a solar panel, or an antenna for example.

Figure 2A:
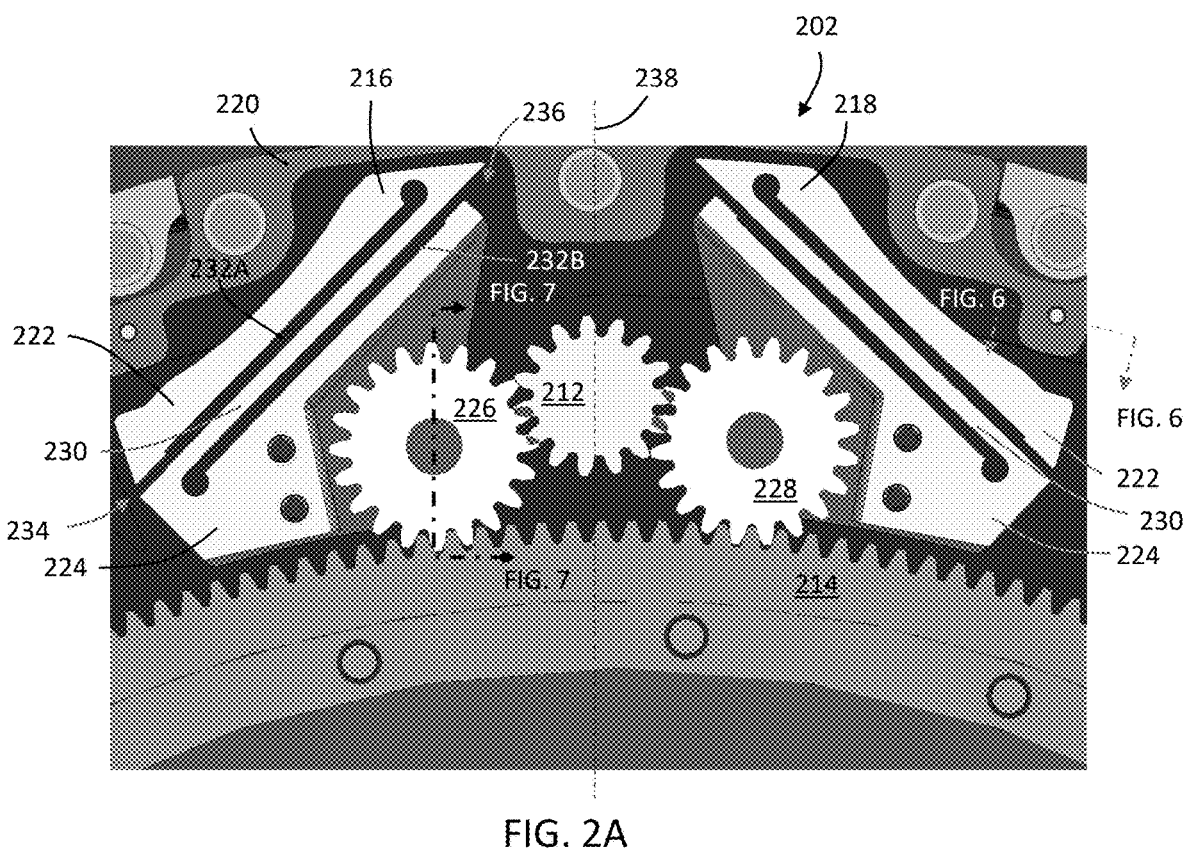
FIG. 2A is a plan view of an anti-backlash mechanism in accordance with an embodiment.
Figure 2B:
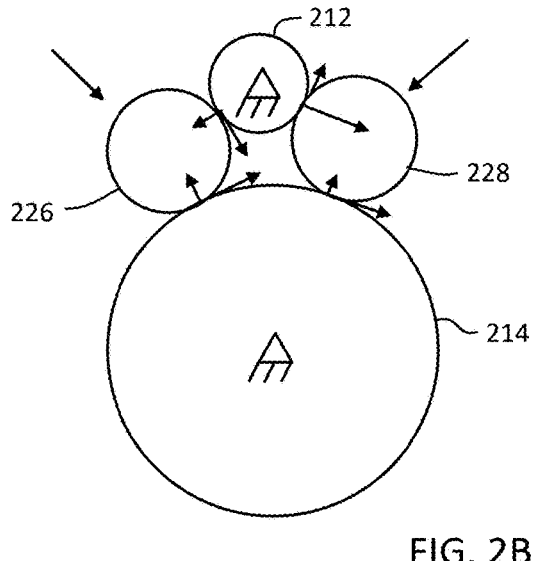
FIG. 2B is a schematic-diagram illustrating forces on the anti-backlash mechanism of FIG. 2A in accordance with an embodiment.

It should be appreciated that in embodiments where precision movements are desired, such as on a mirror on a telescope for example, it is desirable to have no or little backlash between gears. Prior art anti-backlash mechanisms include spring loaded split gears, high precision gears, and external spring windup mechanisms. These systems have a lower than desired stiffness, lower reliability, and in the case of windup springs limited range of motion. Referring now to FIG. 2A-2B an embodiment is shown of an anti-backlash mechanism 202, such as could be used in system 100. The anti-backlash mechanism 202 is operably disposed between a pinion 212 and a load gear 214.

The anti-backlash mechanism 202 includes a pair of flexure members 216, 218 that are coupled to a frame 220. It should be appreciated that while the illustrated embodiment shows the flexure members 216, 218 as being coupled to a common frame 220, in other embodiments, the flexure members may be coupled to separate frames, provided that each of the flexure members remain in a fixed geometric relationship to the pinion 212. In an embodiment, the flexure members 216, 218 are mirror images of each other.

In the illustrated embodiment, each flexure device includes a first portion 222 coupled to the frame 220, a second portion 224 coupled to the one of the idler gears 226, 228. and a biasing portion 230. In this embodiment the flexure members 216, 218 are made from a single unitary member. As such, the flexure members 216, 218 are made from a single material, such as titanium for example. The biasing portion 230 is defined by a pair of slots 232A, 232B. The first slot 232A extends from a first side 234 of the flexure member 216, 218 and the second slot 232B extends from a second side 236 of the flexure member 216, 218. The biasing portion 230 may have a thin planar shape, that functions in a similar manner to a leaf spring. In an embodiment, the biasing portion 230 is oriented on a 45 degree angle relative to an axis 238 extending through the center of the pinion 212. The 45 degree orientation allows for an equal distribution of force between the pinion 212 and the load gear 214 (FIG. 2B).

Since the first portion 222 is coupled to the frame 220, the second portion 224 is effectively suspended, relative to the frame 220. As will be discussed in more detail herein, when the flexure members 216, 218 are assembled to the frame 220, the idler gears 226, 228 are preloaded against the pinion 212 by the biasing portion 230.

Figure 3:
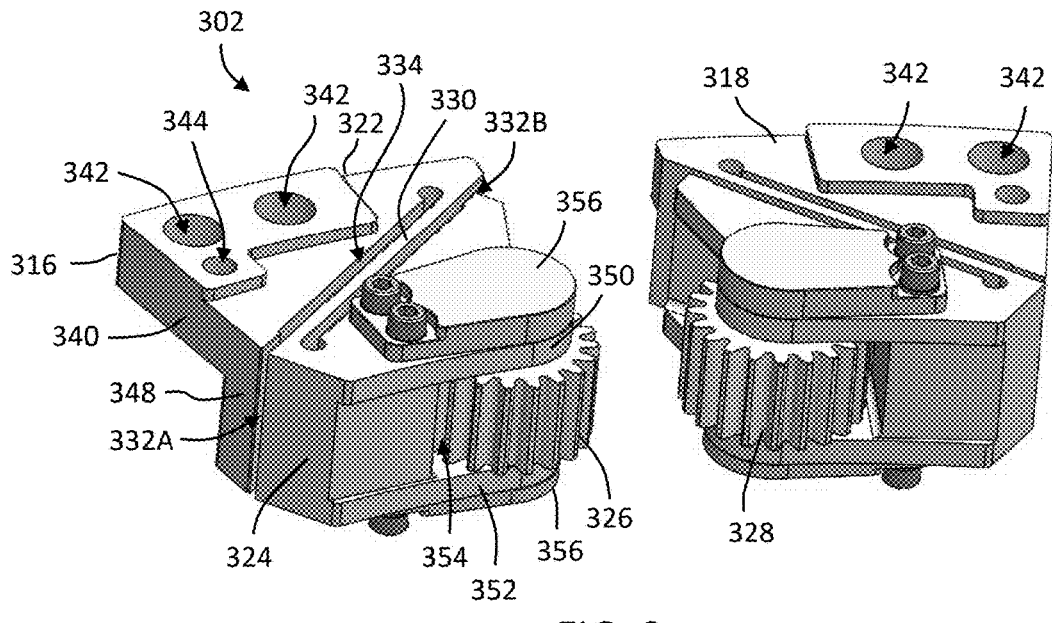
FIG. 3 is a partial perspective view of the anti-backlash mechanism of FIG. 2A in accordance with an embodiment.
Figure 4:
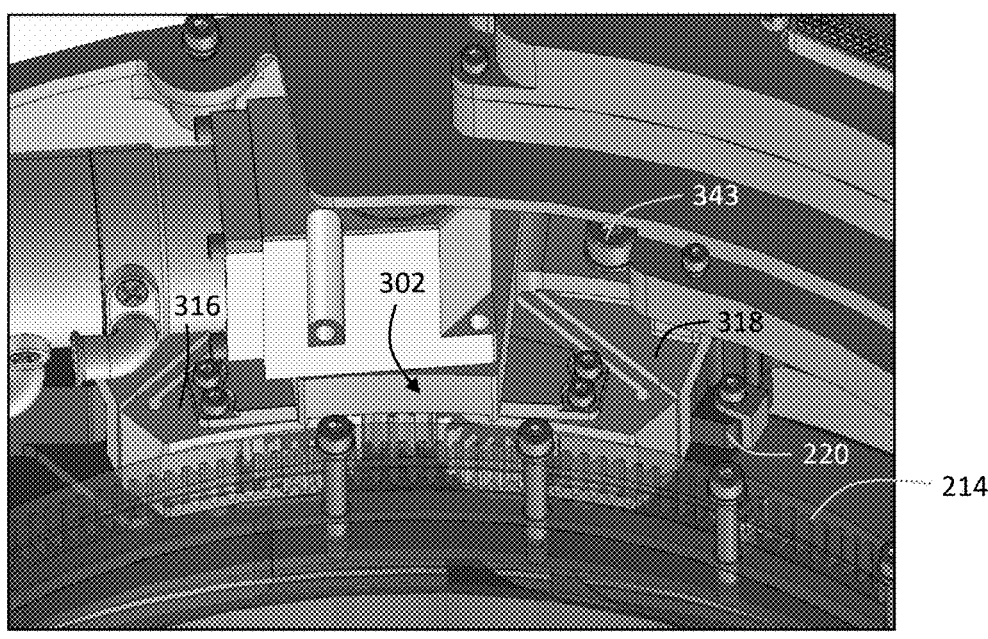
FIG. 4 is a partial perspective view of the system of FIG. 1 in accordance with an embodiment.

Referring to FIG. 3 and FIG. 4, another embodiment is shown of an anti-backlash mechanism 302 having flexure members 316, 318 and idler gears 326, 328. In this embodiment, the first portion 322 includes a body 340 having fastener holes 342 extending therethrough. The holes 342 are sized to receive fasteners 343 (FIG. 4) for coupling the flexure members 316, 318 to the frame 220. The body 340 may further include a pinning hole 344 that is sized to receive a pin 646 (FIG. 6) that allows the flexure members to be positioned with a desired level of preload. As described in more detail herein, in this embodiment, the pin 646 is "wet pinned", meaning flexure member is shimmed to a desired level of preload and the pin is inserted with an adhesive to couple the flexure member in place.

Extending from the body 340 is a leg 348. One side of the leg 348 defines a wall of the slot 334. Extending from the first portion 322 is the biasing portion 330. The biasing portion 330 may be a generally planar member that defines an opposing wall of the slot 332A. In an embodiment, the biasing portion 330 is integral with, or unitary with the first portion 322. In some embodiments, it is desired for the biasing portion 330 to be relatively stiff, this provides advantages in reducing fatigue that may otherwise occur due to vibrations during transportation, such as during a launch event when the anti-backlash mechanism is used on a spacecraft or satellite for example.

Extending from the biasing portion 330 is the second portion 324. The second portion includes an inner wall that cooperates with the biasing portion 330 to define the slot 332B. In an embodiment, the second portion 324 includes a pair of spaced apart planar arms 350, 352 that define a slot 354 sized to receive the idler gears 326, 328. In an embodiment a cover member 356 captures the bearings that support the shaft of the gears 326, 328 as is discussed in more detail with respect to FIG. 7.

Figures 5, 6:
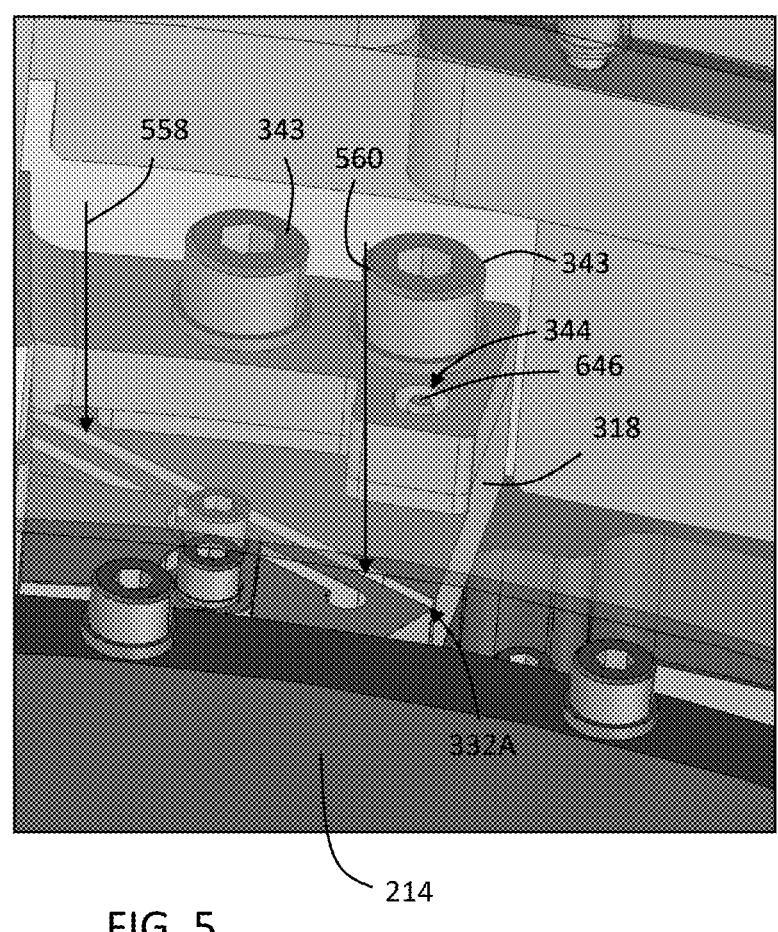
FIG. 5 is a partial perspective view of the system of FIG. 4.
FIG. 6 is a partial sectional view of a coupling arrangement for the anti-backlash mechanism in accordance with an embodiment.

Referring now to FIG. 5 and FIG. 6, a method of preloading the idler gears against the pinion and load gear will be described. As discussed herein, it is desirable to provide a level of preload by the idler gears on the pinion and load gear. This preload reduces or eliminates the backlash and increases the stiffness of the system. This provides advantages in reducing fatigue on the components due to vibration. In an embodiment, the preload is generated during the assembly by inserting shims into the first slot (e.g. slot 232A, 332A) at the locations indicated by arrows 558, 560. Then, the anti-backlash mechanism 202, 302 is adjusted into position and wet pinned in place. The wet pinning includes coating the pin 646 with an adhesive (e.g. epoxy), inserting the pin through the hole 344 and into an adjacent hole 662 in the frame 220. In an embodiment, the hole 662 includes a portion that extends through the frame 220. After the adhesive is cured, the shims are removed and the desired preload is achieved. In an embodiment, the preload is between 4 lbf (17.8 N) to 7 lbf (31.1 N) along the idler gear to load gear centerline.

Figure 7:
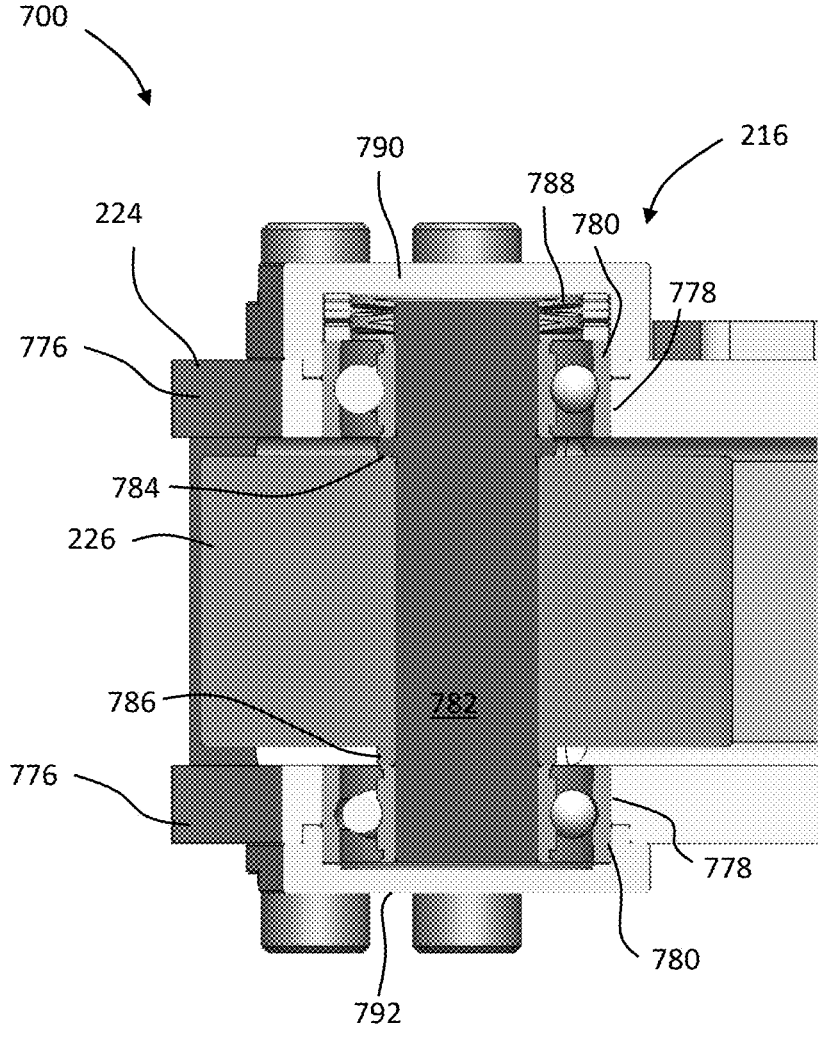
FIG. 7 is a partial sectional view of the anti-backlash mechanism in accordance with an embodiment.

Referring now to FIG. 7, an embodiment of an assembly 700 is shown for supporting the idler gears. It should be appreciated that while FIG. 7 is described and shown with respect to the idler gear 226, the assembly for idler gear 228 may be the same and is not described herein for conciseness purposes. In this embodiment, the idler gear 226 is positioned between two arms 776 that extend from the second portion 224 of the flexure member 216.

The arms 776 each include an opening 778 that is sized to receive a bearing 780, such as a ball-bearing for example. The bearings 780 support a shaft 782 to which the idler gear 226 is coupled. In an embodiment, the idler gear 226 is coupled by a press-fit onto the shaft 782. In an embodiment, the shaft 782 may include an annular projection 784 that the idler gear 226 is pressed against, and which spaces the idler gear apart from one of the bearings 780. In an embodiment, the idler gear 226 may include a projection 786 from a surface opposite the annular projection 784 that spaces the main portion of the idler gear 226 apart from the other of the bearings 780.

In this embodiment, at least one biasing member 788, such as a Bellville washer for example, is arranged to apply a biasing force on one of the bearings 780 to preload the bearings within the assembly 700. The biasing member 788 is captured on or against the bearing 780 by a cap member 790. The cap member 790 is coupled to one of the arms 776. In an embodiment, a second cap member 792 is coupled to the other arm 776 to enclose the other bearing 780.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should also be noted that the terms "first", "second", "third", "upper", "lower", and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An anti-backlash mechanism for a gear assembly having a pinion and an output gear, the anti-backlash mechanism comprising:
   a frame;
   a first idler gear operably disposed between the pinion and the output gear;
   a first flexure device coupled between the first idler gear and the frame, the first flexure device applying a pre-load to the first idler gear to move the first idler gear into engagement with the pinion and the output gear;
   a second idler gear operably disposed between the pinion and the output gear; and
   a second flexure device coupled between the second idler gear and the frame, the second flexure device applying a pre-load to the second idler gear to move the second idler gear into engagement with the pinion and the output gear.

2. The anti-backlash mechanism of claim 1, wherein the first flexure device includes a first portion coupled to the frame, a second portion coupled to the first idler gear, and a biasing portion disposed between the first portion and the second portion.

3. The anti-backlash mechanism of claim 2, wherein the biasing portion is defined by a first slot and a second slot, the first slot being disposed between the first portion and a flexure arm, the second slot being disposed between the second portion and the flexure arm.

4. The anti-backlash mechanism of claim 3, wherein the flexure arm is coupled to the first portion on a first end and is coupled to the second portion on an opposing second end.

5. The anti-backlash mechanism of claim 2, wherein the first portion, the second portion, and the biasing portion are made from the same material.

6. The anti-backlash mechanism of claim 5, wherein the first portion, the second portion, and the biasing portion are made from a single unitary member.

7. The anti-backlash mechanism of claim 5, wherein the material is titanium.

8. A system comprising:
   a rotational driving device having a pinion;
   a load having a load gear configured to rotate in response to rotation of the pinion;
   an anti-backlash mechanism operably coupled between the rotational driving device and the load, the anti-backlash mechanism including:
   a frame;
   a first idler gear operably disposed between the pinion and the load gear;
   a first flexure device coupled between the first idler gear and the frame, the first flexure device applying a pre-load to the first idler gear to move the first idler gear into engagement with the pinion and the load gear;
   a second idler gear operably disposed between the pinion and the load gear; and
   a second flexure device coupled between the second idler gear and the frame, the second flexure device applying a pre-load to the second idler gear to move the second idler gear into engagement with the pinion and the load gear.

9. The system of claim 8, wherein the first flexure device includes a first portion coupled to the frame, a second portion coupled to the first idler gear, and a biasing portion disposed between the first portion and the second portion.

10. The system of claim 9, wherein the biasing portion is defined by a first slot and a second slot, the first slot being disposed between the first portion and a flexure arm, the second slot being disposed between the second portion and the flexure arm.

11. The system of claim 10, wherein the flexure arm is coupled to the first portion on a first end and is coupled to the second portion on an opposing second end.

12. The system of claim 9, wherein the first portion, the second portion, and the biasing portion are made from the same material.

13. The system of claim 12, wherein the first portion, the second portion, and the biasing portion are made from a single unitary member.

14. The system of claim 12, wherein the material is titanium.

15. The system of claim 8, wherein the rotational driving device is an electric motor and the load includes a mirror.

16. A method of assembling an anti-backlash assembly between a driving device and a load, the method comprising:
   coupling a first idler gear to a first flexure device, the first flexure device being disposed between the first idler gear and a frame;

coupling a second idler gear to a second flexure device, the second flexure device being disposed between the second idler gear and the frame;

pre-loading the first idler gear against a pinion with the first flexure device, the pinion being coupled to the driving device; and pre-loading the second idler gear against the pinion with the second flexure device.

17. The method of claim 16, wherein the step of pre-loading the first idler gear includes inserting at least one first shim in a first slot in the first flexure device and wet pinning the first flexure device to the frame.

18. The method of claim 17, wherein the step of pre-loading the second idler gear includes inserting at least one second shim in a second slot in the first flexure device and a wet pinning of the second flexure device to the frame.

19. The method of claim 18, wherein the at least one first shim and at least one second shim are removed after the wet pinning of the first flexure device and the second flexure device has cured.

20. The method of claim 17, wherein the preloading the first idler gear and the preloading of the second idler gear removes backlash between the first idler gear and the pinion and the second idler gear and the pinion.

* * * * *